US012672139B2

(12) United States Patent
Smith et al.

(10) Patent No.: US 12,672,139 B2
(45) Date of Patent: Jun. 30, 2026

(54) MULTI-ACCESS POINT COORDINATION GROUP WITH MULTI-LINK DEVICE AWARENESS

(71) Applicant: Cisco Technology, Inc., San Jose, CA (US)

(72) Inventors: Malcolm M. Smith, Richardson, TX (US); Robert E. Barton, Richmond (CA); Indermeet S. Gandhi, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 18/457,416

(22) Filed: Aug. 29, 2023

(65) Prior Publication Data

US 2024/0381353 A1 Nov. 14, 2024

Related U.S. Application Data

(60) Provisional application No. 63/501,925, filed on May 12, 2023.

(51) Int. Cl.
*H04W 72/1273* (2023.01)

(52) U.S. Cl.
CPC .............................. *H04W 72/1273* (2013.01)

(58) Field of Classification Search
None
See application file for complete search history.

(56) References Cited

U.S. PATENT DOCUMENTS

| | | | | |
|---|---|---|---|---|
| 2021/0120427 A1* | 4/2021 | Wang | .................... | H04W 52/04 |
| 2021/0289499 A1 | 9/2021 | Naribole et al. | | |

| | | | | |
|---|---|---|---|---|
| 2021/0315025 A1 | 10/2021 | Seok et al. | | |
| 2021/0409958 A1 | 12/2021 | Huang et al. | | |
| 2022/0086906 A1* | 3/2022 | Xin | ........................ | H04L 5/0062 |
| 2022/0174691 A1 | 6/2022 | Xia et al. | | |
| 2023/0319886 A1* | 10/2023 | Wang | .................... | H04L 5/0035 |
| | | | | 370/329 |
| 2024/0357619 A1* | 10/2024 | Kulkarni | ............... | H04W 72/12 |

FOREIGN PATENT DOCUMENTS

| | | |
|---|---|---|
| GB | 2595517 A | 12/2021 |
| GB | 2606593 A | 11/2022 |
| WO | 2023077476 A1 | 5/2023 |

OTHER PUBLICATIONS

International Search Report and Written Opinion for International Application No. PCT/US2024/028683, mailed Aug. 27, 2024, 14 Pages.

* cited by examiner

*Primary Examiner* — Marcus Smith
*Assistant Examiner* — Rowan K Fakhro
(74) *Attorney, Agent, or Firm* — Merchant & Gould P.C.

(57) ABSTRACT

Multi-AP Coordination (MAPC) group with Multi-Link Device (MLD) awareness may be provided. Link information of one or more stations associated with each Access Point (AP) of a plurality of APs of a MAPC group may be received. The link information may include a Multi-Link Device (MLD) capability of each of the one or more stations. A proposed transmission schedule of a plurality of stations associated with the plurality of APs of the MAPC group may be received. Transmission Opportunities (TXOPs) for an upcoming interval may be assigned based on the proposed transmission schedule of the plurality of APs and the MLD capabilities of each of the plurality of stations.

20 Claims, 3 Drawing Sheets

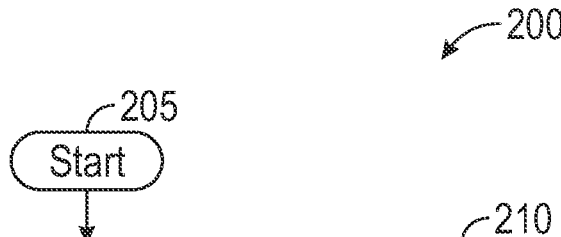

┌─ 205

( Start )

┌─ 210

Receive, from each Access Point (AP) of a plurality of APs of a Multi-AP Coordination (MAPC) group, link information of one or more stations associated with the AP, the link information comprising a Multi-Link Device (MLD) capability of each of the one or more stations;

┌─ 220

Receive a proposed transmission schedule of a plurality of stations associated with the plurality of APs of the MAPC group

┌─ 230

Assign Transmission Opportunities (TXOPs) for an upcoming interval based on the proposed transmission schedule of the plurality of stations and the MLD capabilities of each of the plurality of stations

┌─ 240

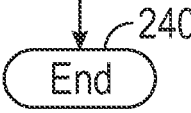

( End )

FIG. 2

MULTI-ACCESS POINT COORDINATION GROUP WITH MULTI-LINK DEVICE AWARENESS

RELATED APPLICATION

Under provisions of 35 U.S.C. § 119 (e), Applicant claims the benefit of U.S. Provisional Application No. 63/501,925, filed May 12, 2023, which is incorporated herein by reference.

TECHNICAL FIELD

The present disclosure relates generally to providing Access Point (AP) coordination and specifically to providing Multi-AP Coordination (MAPC) group with Multi-Link Device (MLD) awareness.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing MAPC group with MLD awareness.

DETAILED DESCRIPTION

Overview

Figure 1:
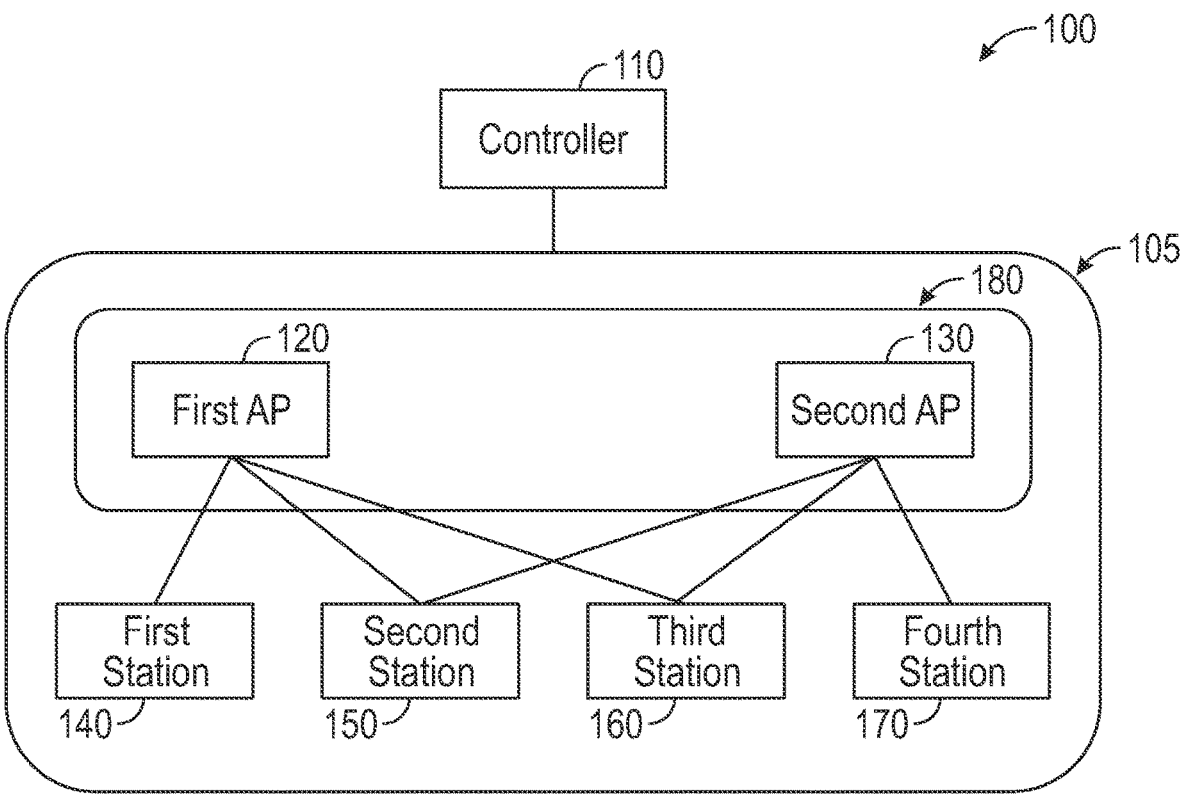
FIG. 1 is a block diagram of an operating environment for Multi-AP Coordination (MAPC) group with Multi-Link Device (MLD) awareness.

Multi-AP Coordination (MAPC) group with Multi-Link Device (MLD) awareness may be provided. Link information of one or more stations associated with each Access Point (AP) of a plurality of APs of a MAPC group may be received. The link information may include a Multi-Link Device (MLD) capability of each of the one or more stations associated with each AP. A proposed transmission schedule of a plurality of stations associated with the plurality of APs of the MAPC group may be received. Transmission Opportunities (TXOPs) for an upcoming interval may be assigned based on the proposed transmission schedule of the plurality of APs and the MLD capabilities of each of the plurality of stations.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the Institute of Electrical and Electronics Engineers (IEEE) 802.11be (Wi-Fi 7) and the IEEE 802.11bn (Wi-Fi 8) standards, Multi-Access Point Coordination (MAPC) and Multi-Link Device (MLD) operation are presented as separate capabilities. MAPC may use Over-The-Air (OTA) signaling to coordinate transmissions between multiple APs, while MLD may use distinct links from the AP and individual stations to improve throughput and latency. While MAPC and MLD operations may be used independently, there may be significant advantages when using MAPC and MLD operations together. For example, by coordinating MAPC and MLD, it may be possible to achieve higher throughput and lower latency than with either capability alone.

One challenge that arises when using MAPC and MLD together is that Transmission Opportunities (TXOPs) seized by an Access Point (AP) in a MAPC group with intent of serving a station within its Basic Service Set (BSS) may no longer be usable if the station (or the AP) may determine to be served on another link in its MLD during that same interval. The disclosure may provide process for providing MAPC group with MLD awareness.

FIG. 1 is a block diagram of an operating environment 100 for MAPC group with MLD awareness. Operating environment 100 may include a network 105 and a controller 110. Network 105 may include a plurality of network devices, for example, a plurality of APs (that is, a first AP 120 and a second AP 130) and a plurality of stations (that is, a first station 140, a second station 150, a third station 160, and a fourth station 170). The plurality of APs (for example, first AP 120 and second AP 130) may form a MAPC group 180. Network 105 may comprise, but is not limited to, a Wireless Local Area Network (WLAN). Network 105 may also be referred to as a coverage environment.

Controller 110 may be a WLAN controller (WLC) and may provision and control network 105. Controller 110 may be implemented by a Digital Network Architecture Center (DNAC) controller (i.e., a Software-Defined Network (SDN) controller). Controller 110, first AP 120, and second AP 130 may provide a WLAN. Through this WLAN, first station 140, second station 150, third station 160, and fourth station 170 may be provided with access to the Internet or other cloud-based networking environments.

Each first AP 120 and second AP 130 may be compatible with specification standards such as, but not limited to, the Institute of Electrical and Electronics Engineers (IEEE) 802.11 specification standard for example. First AP 120 and second AP 130 may communicate with each other to conduct operations in concert. In addition, first AP 120 and second AP 130 may be devices that can send and receive signals to provide a connection to network 105.

First station 140, second station 150, third station 160, and fourth station 170 may communicate with first AP 120 and second AP 130. First station 140, second station 150, third station 160, and fourth station 170 may be, for example, a smart phone, a personal computer, a tablet device, a mobile device, a telephone, a remote control device, a set-top box, a digital video recorder, an Internet of Things (IoT) device, a cellular base station, a telephone, a remote control device, a set-top box, a digital video recorder, a cable modem, a network computer, a mainframe, a router, or other similar microcomputer-based device capable of accessing and using a Wi-Fi network.

The elements described above of operating environment 100 (e.g., controller 110, first AP 120, second AP 130, first station 140, second station 150, third station 160, and fourth station 170) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

FIG. 2 is a flow chart setting forth the general stages involved in a method 200 consistent with embodiments of the disclosure for providing MAPC group 180 with MLD awareness. Method 200 may be implemented first AP 120 as described in more detail above with respect to FIG. 1. However, method 200 may also be implemented using controller 110 and second AP 130 as described in more detail above with respect to FIG. 1. Ways to implement the stages of method 200 will be described in greater detail below.

First AP 120 and second AP 130 may form or agree to be part of or members of MAPC group 180. In some embodiments, a plurality of APs of network 105 within a Radio Frequency (RF) range of each other may negotiate to form or become members of MAPC group 180. However, other mechanisms are possible. For example, controller 110 may instruct a subset of the plurality of APs of network 105, for example, first AP 120 and second AP 130 to form or be become members of MAPC group 180. MAPC group 180 formation and membership may involve exchange of discovery frames. In addition, MAPC group 180 formation may involve exchanging candidacy frames for one AP of the plurality of APs (for example, first AP 120) to act as a MAPC coordinator for MAPC group 180. Other methods may be used to determine a candidate from member APs of MAPC group 180 to become MAPC group coordinator. In some examples, there may be a MAPC group coordinator for each frequency band (that is, a first MAPC group coordinator for 5 GHz band and a second MAPC group coordinator for a 2.4 GHz band) in which the plurality of APs of MAPC group 180 may operate in. A top-level MAPC group coordinator may be elected to coordinate between frequency band level coordinators.

Method 200 may begin at starting block 205 and proceed to stage 210 where first AP 120 may receive, from each AP of the plurality of APs of MAPC group 180, link information of one or more stations associated with the AP. The link information may comprise a MLD capability of each of the one or more stations associated with APs of MAPC group 180. For example, once MAPC group 180 membership has been agreed upon and first AP 120 is elected as a MAPC group coordinator for MAPC group 180, each member AP of MAPC group 180 may send link information of associated stations to first AP 120. For example, second AP 130 may send the link information about third station 160 and fourth station 170 to first AP 120. First AP 120 may already have the link information about first station 140 and second station 150.

The link information about the plurality of stations of MAPC group 180 may include MLD capability of each station. The MLD capabilities may include receiving an indication for each station whether the station is a MLD capable station and supports Multi-Link Operation (MLO). The indication may further include a MLD state of each MLD capable station. The MLD state may include one or more of the following: none, single band, Simultaneous Transmission and Receive (STR), Enhanced Multi-Link Single Radio (EMLSR), Non-Simultaneous Transmission and Reception (NSTR), etc. The link information may further include radios/bands and an AP each station may be connected to. As each station communicates with an AP, additional link information may be gathered. The additional link information may include, for example, a status of a Multi-User Enhanced Distributed Channel Access (MU-EDCA) control mode used with that station. The MU-EDCA control mode may include whether the station may regularly be under an AP schedule/trigger control or the station mostly escape scheduling and uses legacy EDCA access. The additional link information may further include updates on information elements that may have changed or where not fully known yet. These information elements may generally persist across multiple TXOPs and, thus, may be used in a scheduling regime determined by the MAPC coordinator (that is, first AP 120) of MAPC group 180.

Once having received the link information of the one or more stations associated with each AP of MAPC group 180 at stage 210, method 200 may proceed to stage 220 where a proposed transmission schedule of a plurality of stations associated with the plurality of APs of MAPC group 180 may be received. For example, first AP 120 may receive the proposed transmission schedule for each of the first station 140, second station 150, third station 160, and fourth station 170. The proposed transmission schedule may include requests for time-slots to communicate with first AP 120 and second AP 130 to send and receive data.

Once having received proposed transmission schedule of the plurality of stations associated with the plurality of APs of MAPC group 180 at stage 220, method 200 may proceed to stage 230 where first AP 120 may assign TXOPs for an upcoming interval based on the proposed transmission schedule of the plurality of stations and the MLD capabilities of each of the plurality of stations. For example, first AP 120 may use the proposed transmission schedule and the MLD capabilities of each of the plurality of stations to control allocation of TXOPs for the upcoming interval. First AP 120 may control resources to be allocated to which AP in the upcoming interval based on the MLD state for target stations, knowing presence and possible competition of other stations. In some examples, first AP 120 may allocate TXOPs to stations that may not be considered for the upcoming interval allocation, but that may decide to send anyway in legacy mode, for example, without being scheduled.

In accordance with example embodiments, first AP 120 may allocate TXOPs to member APs based on the MLD state and the MU-EDCA control state of each of the plurality of stations of MAPC group 180. A target station, for example, first station 140, may be under MU-EDCA control (thus may be constrained to a requested time-slot) and a competing station, for example, second station 150, may also have requested the same time-slot (from a different AP), thus resulting in a possible conflict (that is, not enough time or Resource Units (RUs) to serve both to their full request). First AP 120 then may evaluate different schedule proposals and respond with an overriding new proposal that may aim to avoid the conflict.

For example, if first station 140 (that is, the station of interest) is a single-link station (with a serving AP (for example, first AP 120) fixed and the requested time-slot unmovable), then first AP 120 may consider the MLD state of competing stations (for example, second station 150, third station 160, and fourth station 170) requesting resources in the same time-slot. The MLD state of the competing stations may be considered either individually or iteratively (thus use of a cumulative bias) or as a predominance (that is, the most competing station of MAPC group 180). When the most competing station (for example, second station 150) is also a single link station, first AP 120 may allocate TXOPs to serve second station 150 in the requested same time-slot as the station of interest (that is, first station 140) from a same co-channel AP (that is, first AP 120). In this scenario no MLD related MAPC TXOP optimization may be achievable. However, if second station 150 is a STR station, it may be capable of using multiple links to send and receive data. Therefore, then any link of second station 150 may be used by second station 150. First AP 120, therefore, may bias away from assigning TXOPs to first AP 120 with second station 150 towards another AP (for example, second AP 130). Second AP 130 may be serving a competing EMLSR station or a NSTR station.

In another scenario, the competing station (that is, second station 150) may be an EMLSR station. An EMLSR station may be a multi-link station capable of switching between different bands. Second station 150, in this scenario may require an active link to wake up the other link of second station 150. Therefore, first AP 120 may allocate a small wake-up time-slot to first AP 120 with second station 150 and then instruct second station 150 to serve on the other links. Other links may be assigned and served with second AP 130.

In yet another scenario, the competing station (that is, second station 150) may be a NSTR station. A NSTR station may not support simultaneous transmit and receive on more than one link and may requires Physical Layer Protocol Data Unit (PPDU) end-time alignment. First AP 120, in this scenario, may either treat second station 150 as a link-flexible and may bias almost completely away from first AP 120 (for example, if a predominant MLD state is known) or may split the allocation between two links (for example, if enough is known of second station 150 to avoid misalignment).

In examples, if the station of interest (that is, first station 140) is a STR station and a competing station (that is, second station 150) is a single-link station, then first AP 120 may bias first station 140 away from first AP 120 instead of holding first station's 140 request. If first station 140 is a NSTR station, then also first AP 120 may bias first station 140 away from first AP 120 instead of holding first station's 140 request. Once having assigned the TXOPs for the upcoming interval at stage 230, method 200 may terminate at end block 240.

In examples, when a new AP joins MAPC group 180, stages 210-230 of method 200 may be repeated with added link information of associated stations of the new AP. Similarly, when an associated AP leaves MAPC group 180 stages 210-230 of method 200 may be repeated without the information about associated stations of the leaving new AP.

Figure 3:
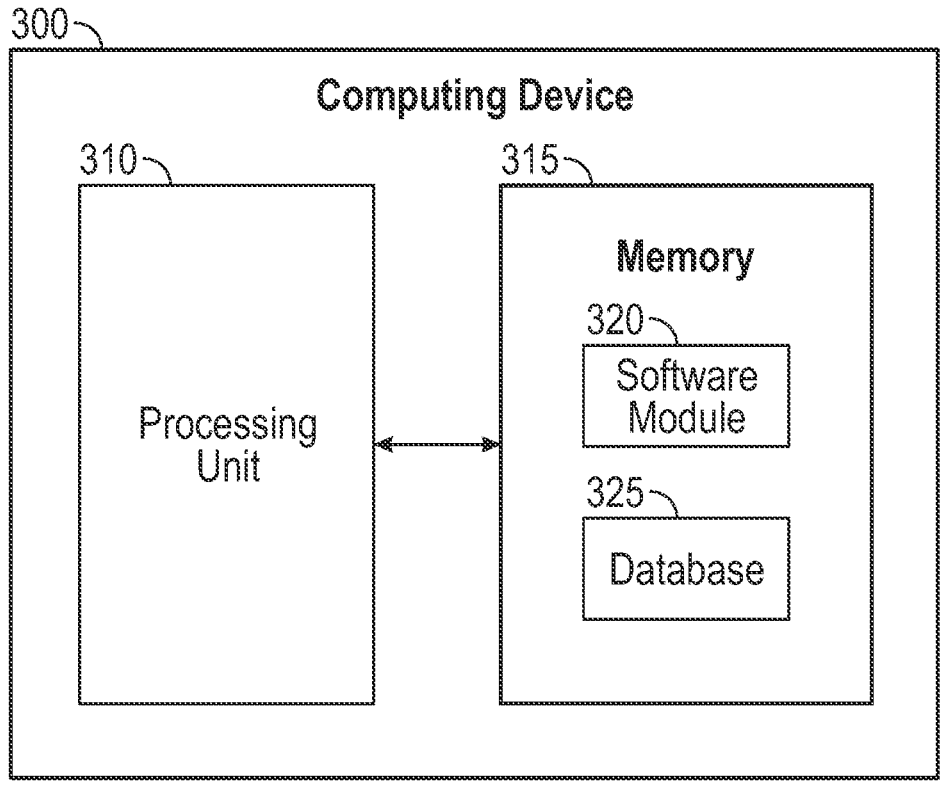
FIG. 3 is a block diagram of a computing device.

FIG. 3 is a block diagram of a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes providing MAPC with MLD awareness described with respect to FIG. 2. Computing device 300, for example, may provide an operating environment for controller 110, first AP 120, second AP 130, first station 140, second station 150, third station 160, and fourth station 170, and the like. Controller 110, first AP 120, second AP 130, first station 140, second station 150, third station 160, and fourth station 170, and the like may operate in other environments and are not limited to computing device 300.

Computing device 300 may be implemented using an AP, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, from each Access Point (AP) of a plurality of APs of a Multi-AP Coordination (MAPC) group, link information of one or more stations associated with the AP, the link information comprising a Multi-Link Device (MLD) capability of each of the one or more stations;
receiving a proposed transmission schedule of a plurality of stations associated with the plurality of APs of the MAPC group; and
assigning Transmission Opportunities (TXOPs) for an upcoming interval based on the proposed transmission schedule of the plurality of stations and the MLD capabilities of each of the plurality of stations, wherein assigning the TXOPs comprises:
determining that a first station of interest is a single link with a first AP with an unmovable requested time-slot in the upcoming interval; and
determining, in response to determining that the first station of interest is the single link with the first AP with the unmovable requested time-slot, a MLD state of a second station of the plurality of stations with a competing requested time-slot in the upcoming interval.

2. The method of claim 1, further comprising:
creating the MAPC group comprising the plurality of APs; and
electing a MAPC group coordinator of the MAPC group.

3. The method of claim 2, wherein electing the MAPC group coordinator comprises:
exchanging candidacy frames for one AP with the plurality of APs to act as the MAPC group coordinator.

4. The method of claim 1, wherein receiving the MLD capability further comprises:
receiving an indication of a MLD state of each of the plurality of stations, the MLD state comprising one of the following: none, single band, Simultaneous Transmission and Receive (STR), Enhanced Multi-Link Single Radio (EMLSR), and Non-Simultaneous Transmission and Reception (NSTR).

5. The method of claim 1, further comprising:
receive a status of a Multi-User Enhanced Distributed Channel Access (MU-EDCA) control mode for each of the plurality of stations.

6. The method of claim 1, wherein determining the MLD state of the second station comprises determining that the second station is a Simultaneous Transmission and Receive (STR) station, and the method further comprising:
biasing away from assigning the TXOPs to the second station with the first AP for the upcoming interval to a second AP.

7. The method of claim 1, wherein determining the MLD state of the second station comprises determining that the second station is an Enhanced Multi-Link Single Radio (EMLSR) station, and the method further comprising:

assigning a wake-up time-slot in the upcoming interval to the second station with the first AP; and instructing, after assigning the wake-up time-slot, to be served on another link with a second AP.

8. The method of claim 1, further comprising:

negotiating by the plurality of APs of a network within a Radio Frequency (RF) range of each other to form or become members of the MAPC group.

9. A system comprising:

a memory storage; and a processing unit coupled to the memory storage, wherein the processing unit is operative to:

receive, from each Access Point (AP) of a plurality of APs of a Multi-AP Coordination (MAPC) group, link information of one or more stations associated with the AP, the link information comprising a Multi-Link Device (MLD) capability of each of the one or more stations;

receive a proposed transmission schedule of a plurality of stations associated with the plurality of APs of the MAPC group; and assign Transmission Opportunities (TXOPs) for an upcoming interval based on the proposed transmission schedule of the plurality of stations and the MLD capabilities of each of the plurality of stations, wherein the processing unit being operative to assign the TXOPs comprises the processing unit being operative to:

determine that a first station is a single link with a first AP with an unmovable requested time-slot in the upcoming interval; and determine, in response to determining that the first station is the single link with the first AP with the unmovable time-slot, a MLD state of a second station of the plurality of stations with a competing requested time-slot in the upcoming interval.

10. The system of claim 9, wherein the processing unit is further operative to:

create the MAPC group comprising the plurality of APs; and elect a MAPC group coordinator of the MAPC group.

11. The system of claim 9, wherein the processing unit being operative to receive the MLD capability further comprises the processing unit being operative to:

receive an indication of a MLD state of each of the plurality of stations, the MLD state comprising one of the following: none, single band, Simultaneous Transmission and Receive (STR), Enhanced Multi-Link Single Radio (EMLSR), and Non-Simultaneous Transmission and Reception (NSTR).

12. The system of claim 9, wherein the processing unit being operative to determine the MLD state of the second station comprises the processing unit being operative to determine that the second station is a Simultaneous Transmission and Receive (STR) station, and wherein the processing unit is further operative to:

bias away from assigning the TXOPs to the second station with the first AP for the upcoming interval to a second AP.

13. The system of claim 9, wherein the processing unit being operative to determine the MLD state of the second station comprises the processing unit being operative to determine that the second station is an Enhanced Multi-Link Single Radio (EMLSR) station, and wherein the processing unit is further operative to:

bias away from assigning the TXOPs to the second station with the first AP for the upcoming interval to a second AP.

14. A non-transitory computer-readable medium that stores a set of instructions which when executed perform a method executed by the set of instructions comprising:

receiving, from each Access Point (AP) of a plurality of APs of a Multi-AP Coordination (MAPC) group, link information of one or more stations associated with the AP, the link information comprising a Multi-Link Device (MLD) capability of each of the one or more stations;

receiving a proposed transmission schedule of a plurality of stations associated with the plurality of APs of the MAPC group; and assigning Transmission Opportunities (TXOPs) for an upcoming interval based on the proposed transmission schedule of the plurality of stations and the MLD capabilities of each of the plurality of stations, wherein assigning the TXOPs comprises:

determining that a first station of interest is a single link with a first AP with an unmovable requested time-slot in the upcoming interval; and determining, in response to determining that the first station of interest is the single link with the first AP with the unmovable requested time-slot, a MLD state of a second station of the plurality of stations with a competing requested time-slot in the upcoming interval.

15. The non-transitory computer readable medium of claim 14, further comprising:

creating the MAPC group comprising the plurality of APs; and electing a MAPC group coordinator of the MAPC group.

16. The non-transitory computer readable medium of claim 14, wherein receiving the MLD capability further comprises:

receiving an indication of a MLD state of each of the plurality of stations, the MLD state comprising one of the following: none, single band, Simultaneous Transmission and Receive (STR), Enhanced Multi-Link Single Radio (EMLSR), and Non-Simultaneous Transmission and Reception (NSTR).

17. The non-transitory computer readable medium of claim 14, wherein determining the MLD state of the second station comprises determining that the second station is a Simultaneous Transmission and Receive (STR) station, and the method further comprising:

biasing away from assigning the TXOPs to the second station with the first AP for the upcoming interval to a second AP.

18. The non-transitory computer readable medium of claim 14, wherein determining the MLD state of the second station comprises determining that the second station is an Enhanced Multi-Link Single Radio (EMLSR) station, and the method further comprising:

assigning a wake-up time-slot in the upcoming time interval to the second station with the first AP; and instructing, after assigning the wake-up time-slot, the second station to be served on another link with a second AP.

19. The non-transitory computer readable medium of claim 14, further comprising:

negotiating by the plurality of APs of a network within a Radio Frequency (RF) range of each other to form or become members of the MAPC group.

20. The non-transitory computer readable medium of claim 15, wherein electing the MAPC group coordinator comprises:

exchanging candidacy frames for one AP with the plurality of APs to act as the MAPC group coordinator.

\* \* \* \* \*